United States Patent Office 3,192,157
Patented June 29, 1965

3,192,157
STABILIZED GREASE COMPOSITION
William G. Gowdy, Midland, Mich., assignor to Dow Corning Corporation, Midland, Mich., a corporation of Michigan
No Drawing. Filed Feb. 1, 1963, Ser. No. 255,674
4 Claims. (Cl. 252—28)

This invention relates to a stabilized solvent resistant organosilicon grease composition.

Greases are widely used in this industrial age as lubricating substances. These have a butter-like consistency, which can be easily applied to an area to be lubricated with the reasonable expectation that the material will not migrate from the applied location. Thus, a grease must be easily worked but instantly cease moving or flowing when the working pressure is removed.

Many greases are made from fluids by adding to them small amounts of a finely divided solid filler in sufficient amount to impart the above-described butter-like consistency to the mixture.

Silicone greases can be made by mixing silicone fluids with a minor portion of a finely divided solid, often a finely divided silica. Greases based on silicone fluids exhibit the high- and low-temperature serviceability, smaller temperature-viscosity dependency, better aging (i.e. weathering, etc.) resistance characteristic of silicone materials over their organic counterparts. Silicone greases based on fluorosilicone fluids have, in addition to the above recited attributes, high resistance to swelling and/or solution in ordinary organic fuels, oils and solvents.

The combination of a fluorosilicone fluid with a finely divided silica filler is disclosed in British Patent 899,659. While this disclosed composition produces a grease having the properties supra, such a combination fails in that upon prolonged exposure to working, i.e. mixing, smearing and/or shearing action, the grease becomes "runny"; that is, the mixture flows even under no shear. In fact, often the extra shearing given to a mix being prepared in high speed equipment is sufficient to render the mixture runny and therefore useless as a grease. Increasing the amount of thickener (silica) stiffens the grease, but when sufficient filler has been added to prevent the runny effect, the grease becomes too stiff and crumbly, or is gel-like and sticky after storage. Thus, the disclosed grease is unusable when significant mixing, smearing or shearing action—that is, working—is to be exerted on it. Such action can, of course, be exerted on it in use, so that the grease would fail in use thereby.

It is an object of this invention to prepare a stable fluorosilicone grease. It is a further object of this invention to produce a fluorosilicone grease that retains its grease-like character when subjected to heavy working. These and other objects will be apparent from the following description.

This invention relates to a composition comprising (1) 100 parts by weight of a polysiloxane fluid which has a viscosity of from 2,000 to 100,000 cs. at 25° C., in which essentially all the units have the formula

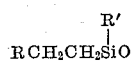

in which each R is a perfluoroalkyl radical and each R' is an aliphatic monovalent hydrocarbon radical of less than three carbon atoms, (2) from 4 to 8 parts by weight of a silica filler having a surface area of at least 50 square meters per gram, and (3) from 1 to 5 parts by weight of a hydroxylated polysiloxane fluid of from 0.5 to 5.0 weight percent hydroxyl content in which siloxane essentially all of the units are of the formula

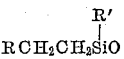

wherein R and R' have the above defined meanings.
Polysiloxane (1) is essentially of the unit formula

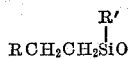

Radical R is a perfluoroalkyl radical. Radical R can be, for example, $CF_3-$, $C_2F_5-$, $C_7F_{15}-$ or $C_{14}F_{29}-$, both straight and branched chain. Radical R' is monovalent aliphatic, containing less than three carbon atoms. Thus, radical R' can be for example, methyl, ethyl, or vinyl. In view of this, examples of siloxane units suitable for polysiloxane (1) include:

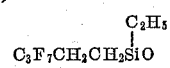

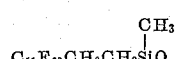

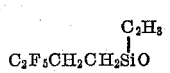

and

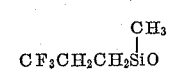

As is well known small amounts of common diorganosiloxanes such as dimethylsiloxane, ethylmethylsiloxane, etc., up to about 10 mol percent, can be present in siloxane (1), and these copolymers are considered within the scope of the invention. While any of the above defined R and R' radicals can be employed in the siloxanes of this invention, preferred R radicals because of economic considerations contain less than four carbon atoms and the preferred R' radical is the methyl radical.

Siloxanes (1) of this invention are generally produced from chlorosilanes which are produced from the reaction of fluorinated alkenes of the formula $RCH=CH_2$ with dichlorosilanes of the formula $R'HSiCl_2$ in the presence of a peroxide or platinum catalyst at temperatures of from 150° to 300° C. These chlorosilanes are then hydrolyzed in the conventional manner and the resulting hydrolyzate is then heated with an alkali metal hydroxide or an alkali metal salt of a siloxane under conditions which cause the corresponding cyclotrisiloxane to distill from the reaction mixture. The preparation and isolation of these cyclic trisiloxanes are more completely described in U.S. Patent 2,979,519.

The cyclic trisiloxanes are polymerized by heating in the presence of an alkaline catalyst, e.g. alkali metal hydroxide, quaternary ammonium hydroxide and siloxane salts of such hydroxides or in the presence of such common acid catalysts as sulfuric acid. The best method for this polymerization is more fully set out in U.S. Patent 3,002,951.

In the polymerization of the cyclic trisiloxanes, there may be present such materials as hexaorganodisiloxanes, octaorganotrisiloxanes, decaorganotetrasiloxanes and the like, which can supply to the fluorinated siloxane polymer endblocking units such as the corresponding triorganosiloxy, pentaorganodisiloxy and heptaorganotrisiloxy radicals. If these groups are not supplied, the resulting linear polymers will be hydroxy endblocked.

If endblocking groups are present in a polymerization system using the above-named acids or bases, the resulting product will be a mixture of fluorinated polymers endblocked with both organosiloxy units and hydroxyl groups. For this invention, however, the best fluid organopolysiloxanes (1) are produced by copolymerizing the cyclic trisiloxanes discussed above with low molecular weight siloxane fluids supplying organosiloxy endblocking units by employing as catalysts any of various fluoroalkyl sulfonic acids, e.g. $CF_3SO_3H$ or $HCF_2CF_2SO_3H$, in the place of the standard catalysts. This is more fully described in U.S. Patent 2,961,425. With this method for producing the organopolysiloxane (1) component of this invention a simple adjustment of the proportions of cyclic trisiloxane to the siloxane supplying endblocking units produces a polymer having any viscosity within the range required for siloxane (1) by controlling the degree of polymerization, i.e. the number of units in the polymer.

The patents referred to above are incorporated into this specification by reference.

The viscosity of siloxane (1) can range from 2,000 to 100,000 cs. inclusive, as stated above. A preferred range is 5,000 to 20,000 cs. When the viscosity of siloxane (1) is less than 2,000 cs. the composition cannot be made that is stable to "bleed"; that is, some of the fluid will ooze out of the grease mixture on standing. When the viscosity of siloxane (1) is more than 100,000 cs., the addition of sufficient filler to give a grease-like consistency gives also a mixture that is sticky and too high in consistency for practical use. When the viscosity of siloxane (1) is within the stated limits, good greases result from the composition of the invention. Generally, the lower viscosities of siloxane (1) favor softer greases and the higher viscosities firmer greases, allowing a measure of control of the firmness of the grease by selecting the viscosity of siloxane (1).

Component (2) of this invention is a silica filler. By silica filler is meant a particulated material that is mainly $SiO_2$. For the purpose of this invention the silica filler should have a surface area of at least 50 square meters per gram, as measured by nitrogen adsorption in the method of ASTM Special Technical Bulletin No. 51, page 95 et seq., 1941. When the surface area of the silica is less than 50 square meters per gram the desired thickening effect is not obtained. This is not to say that a fluid cannot be thickened with these low-surface-area fillers. However, when sufficient of such a filler is added to obtain appreciable thickening, the drying effect is great enough that a paste-like material results, which is often quite abrasive. In addition, the fluid "bleeds" or otherwise separates from these low-surface-area fillers quite easily. Any silica having a surface area of 50 square meters per gram or higher, ranging to 900 square meters per gram and higher, is operable in the composition of this invention.

The amount of filler employed is dependent on the extent of thickening desired, but in any case is from 4 to 8 parts by weight per hundred parts of polysiloxane (1). When less than 4 parts of silica filler are used, the mixture flows freely, and will not remain where placed. When more than eight parts of filler are employed the stiffness of the grease is too high for practical use. Further, the mixture is often sticky and gel-like. When the amount of filler employed is within the limits set forth in the statement of the invention, a good balance is maintained so that the resulting grease is neither too stiff nor free-flowing. Within these limits the amount of filler can be varied to obtain a softer or firmer grease, as desired. In addition, the higher the surface area of the filler the firmer the grease on an equal weight of filler loading. Thus, it is easy to obtain a grease of exactly the desired consistency by a selection of the viscosity of siloxane (1) combined with the quantity and surface area of silica filler (2).

Component (3) of this invention is a hydroxylated essentially diorganopolysiloxane of the unit formula

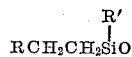

Radicals R and R' are illustrated above for component (1) of this invention, and the general description and discussion regarding radicals R and R' and makeup of siloxane units apply equally to both components (1) and (3) of this invention. The respective radicals R and R' can be the same in both components, or different, as desired. Whether they are the same or different is completely immaterial to the composition of this invention.

While essentially all of the units of component (3) are the defined diorganosiloxane units, it is understood in the art that these polymers can usually contain small amounts of $RSiO_{3/2}$, $R'SiO_{3/2}$ and $SiO_2$ units. These latter units are generally present in amounts less than one percent by weight, but for the purpose of this invention they could be present in larger amount without deleterious effect. It is well known that copolymers containing small amounts, such as up to 10 mol percent, of conventional diorganosiloxanes such as dimethylsiloxane, ethylmethylsiloxane, phenylmethylsiloxane, etc., can be present without changing the character of siloxane (3) and such copolymers are considered within the scope of this invention.

The percentage of hydroxyl radicals in component (3) should range from 0.5 to 5 percent by weight inclusive. When more than 5 percent by weight of hydroxy is present the siloxane does not perform as desired infra, due probably to its different character attributable to the high concentration of hydroxyl radicals. When less than 0.5 percent hydroxyl radicals are present the siloxane is again ineffective, due probably to, in this case, the low percentage of hydroxyl radicals.

Siloxane (3) of this invention can be produced from chlorosilanes, the preparation of which is described above in the discussion concerning siloxane (1). Hydrolysis of these chlorosilanes produces siloxane (3), along with cyclic siloxanes, which latter are conveniently removed by volatilization. The said hydrolysis is ordinarily carried out by adding the chlorosilane to an excess of water, either with or without a solvent, as ambient temperatures. The reaction is exothermic, and cooling may be advisable for safety reasons, but is not necessary to the production of siloxane (3) of this invention.

In a second method of preparing siloxane (3) the cyclotrisiloxane of the unit formula $RCH_2CH_2Si(R')O$ is reacted with aqueous ammonia or an organic amine in the presence of water to produce a hydroxyl endblocked diorganopolysiloxane of like unit formula. This method is more particularly described in copending application Serial No. 127,832, now Patent No. 3,142,251, filed July 31, 1961, and assigned to the same assignee as this invention, which application is made a part of this application by reference.

In a third method of preparing siloxane (3) of this invention a polysiloxane of the unit formula

is reacted with ammonium hydroxide or with a primary aliphatic amine and water under pressure at a temperature of above 100° C. These methods produce hydroxylated polysiloxanes, and are more particularly described in U.S. Patents 3,046,293 and 3,046,294, which patents are by reference made a part of this specification.

The above methods are but a few of the many methods of preparing the hydroxylated siloxane (3) of this invention. The method by which it is produced is unimportant, as any hydroxylated siloxane as defined above will properly function as component (3) of this invention.

The desired and obtained effect of employing the defined siloxane (3) in the composition of this invention is that of rendering the butter-like consistency of the grease stable toward even heavy working, i.e. mixing, shearing or smearing action on it. When a grease not containing component (3) of this invention is subjected to a heavy working action as one of the above, the "worked consistency" of the grease is substantially less than the "unworked consistency." Not so the composition of this invention; the worked and unworked consistencies are very nearly the same.

The amount of component (3) to be employed sometimes depends in part on the quantity of silica filler (2), but in any case should not be less than one part nor more than 5 parts, and preferably from 2 to 4 parts inclusive, per hundred parts of siloxane (1). When less than one part of hydroxylated siloxane (3) is used, the composition loses its stability to heavy working. When more than 5 parts of siloxane (3) is employed the consistency of the grease becomes too soft, due to the diluting effect of this low viscosity component. When siloxane (3) is employed in the cited range a good grease which is stable to heavy working is obtained. Slight variations of the amount of siloxane (3) may be necessary when the surface area, or nature of the surface of silica filler (2) is changed, but this is small, being the order of about 1 part of siloxane (3). Generally, the higher surface area fillers impart a higher requirement of siloxane (3), while fillers treated on the surface thereof with organosilyl groups may impart a somewhat lower requirement of siloxane (3) in the grease, other factors bein gthe same. In any case, one skilled in the art of formulating a grease will experience no difficulty in formulating the superior grease of this invention.

The composition of this invention is prepared by mixing components (1), (2), and (3) of this invention until a material of uniform consistency is obtained. Any convenient form of mixing, such as a 3-roll mill, industrial mixer or other stirring device can be employed. Small batches can often be mixed by hand. The order of addition of the components is completely unimportant. In addition, components (1) and (2), or (1) and (3) can be premixed, and stored for any length of time, if desired, prior to adding the remaining component. While it is not practical to premix components (2) and (3) as there is not sufficient (3) to wet (2), there is no harm in doing this. In the mixing operation a solvent or solvents for the fluorosilicone fluids can be employed, if desired, but these will need to be removed in order to obtain the finished grease composition, and the operation is not particularly practical in that mixing is not difficult in the absence of a solvent. For maximum uniformity of product it is often desirable to pass the mixture through a three-roll mill or other thorough mixing source.

The compositions of this invention are especially useful as stopcock greases and valve lubricants. Any use to which a grease-like material can be put wherein resistance to swelling and/or solution in ordinary organic fluids, (i.e., solvents and oils) is necessary is a use to which the grease described herein is especially adapted. In particular is this grease excellent where it will be contacted by the usual liquid fuels used for rockets.

In addition to the recited components, other materials can be added to the instant composition, such as pigments, oxidation inhibitors, "bleed" controllers, etc. "Bleed" is the separation of fluid from a grease. These additives are not ordinarily employed in significant quantities and do not affect the stability of the instant composition.

The following examples are illustrative only and are not intended to limit the invention which is properly delineated in the appended claims.

In the examples all parts are by weight unless otherwise specified. Viscosities are measured at 25° C. The tests utilized in the examples are as follows:

(1) *Stability to working.*—A standard test, ASTM D217–52T, was employed to determine the amount of penetration of a cone-shaped weight into a standard quantity of grease, both before and after a standard amount and kind of working. The results are expressed as mils (thousandths of inches) of penetration, each for "unworked" and "worked" samples. The more nearly the same penetration for worked and unworked samples, the more stable to working is the grease. The reference above is hereby incorporated into this specification by reference.

(2) *Fluid resistance.*—For this determination a military specification, MIL–G–6032A, Solubility in Fuel, 4.4.5.1, hereby incorporated by reference, was followed, employing various fluids including the standard fuel called for in the said specification. Briefly, the procedure is as follows:

Two grams of test grease are weighed into a 100 ml. centrifuge tube. A 100 ml. portion of test fluid is added and the tube stoppered and shaken vigorously for approximately one-half hour, or until the grease is thoroughly dispersed. The mixture is then centrifuged 20 minutes at 2,000 revolutions per minute. A 50 ml. aliquot of the clear supernatant fluid is transferred to a tared dish, evaporated to dryness on a steam bath, and further dried one hour at 212° F. The weight of residue is determined, and the percent of grease soluble in the test fluid is calculated from the formula $$\text{Percent soluble} = 2 \times \frac{\text{Wt. residue}}{\text{Wt. sample}} \times 100 = 100 \ (\text{Wt. residue})$$

The percent of grease soluble in the various fluids is shown in the accompanying tables as "Solvent Solubility."

Reference Fuel II, employed in testing some of the samples, is a mixture containing, by weight, 60 percent isooctane, 5 percent benzene, 20 percent toluene and 15 percent xylene.

EXAMPLE 1

One hundred parts of a trimethylsilyl endblocked 3,3,3-trifluoropropylmethylpolysiloxane fluid, having a viscosity of 10,000 cs., and 7.5 parts of a fume silica having a surface area of 225 square meters per gram were mixed to a uniform condition, first by mixing in a hand mixer, then by-passing the mix through a three-roll mill. Worked and unworked penetrations were determined on this sample in accordance with the standard ASTM test above. Fluid resistance was determined as above described for Reference Fuel II, ethyl alcohol, water and kerosene, and is expressed as percent soluble according to the military specification above. These results appear in Table I below, as sample 1. This sample duplicates the grease disclosed in Britain Patent 899,659.

EXAMPLE 2

One hundred parts of the polysiloxane of Example 1, and 7.5 parts of the filler, were mixed with 2.15 parts of a hydroxylated 3,3,3-trifluoropropylmethylpolysiloxane, having a hydroxyl content of 1.8 weight percent, 0.32 of boric acid and 0.32 part of pentaerythritol. The resulting grease was tested in like manner to the grease of Example 1. The results appear in Table I for sample 2.

EXAMPLE 3

In this example a grease was made the same as the grease in Example 2, except there was used 3.2 parts of the hydroxylated 3,3,3-trifluoropropylmethylpolysiloxane fluid. This grease was also tested as in Example 1, and the results appear in Table I as sample 3.

*Table I*

| Sample | Penetration, mils | | Fluid resistance, percent | | | |
|---|---|---|---|---|---|---|
| | Unworked | Worked | Ref. Fuel II | Ethyl alcohol | Water | Kerosene |
| 1 | 220 | >400 | 6 | 6 | Nil | 11 |
| 2 | 210 | 227 | 2 | 5 | Nil | 2 |
| 3 | 220 | 250 | 2 | 14 | Nil | 8 |

Sample 1, containing no hydroxylated siloxane fluid, has poor resistance to working, as evidence by the large change in penetration upon working. Samples 2 and 3, both containing the hydroxylated siloxane fluid, differ from sample 1 in that they are stable to working, as shown by the small change in penetration from unworked to worked penetration. The fluid resistance of both samples 2 and 3, as measured by grease solubility, is substantially better than that of sample 1.

EXAMPLE 4

One hundred parts of a trimethylsilyl-endblocked 3,3,3-trifluoropropylmethylpolysiloxane fluid having a viscosity of 7,000 cs., 4.85 parts of the fume silica of Example 1 and 2.15 parts of the hydroxylated siloxane of Example 2 were mixed throughly. The resulting grease was tested for penetration unworked and worked, to determine its stability. Solubility of the grease in Reference Fuel II was also determined.

Penetration:
    Unworked _____mils__ 280
    Worked _____do____ 320
Ref. Fuel II solubility _____percent__ <2

EXAMPLE 5

When any of the following polysiloxanes are substituted for polysiloxane (1) of Example 4, good greases result, having good resistance to change upon heavy working, and generally excellent fluid resistance.

(a) A hydroxyl-endblocked 3,3,4,4,4-pentafluorobutylethylpolysiloxane having a viscosity of 20,000 cs.

(b) A mixture containing ten parts of fluid (a) above and 90 parts of the siloxane (1) of Example 4.

(c) A 3,3,3 - trifluoropropyldimethylsilyl-endblocked polysiloxane containing 35 mol percent of units of the formula

$$\underset{\underset{\text{C}_7\text{F}_{15}\text{CH}_2\text{CH}_2\text{SiO}}{|}}{\text{CH}_3}$$

60 mol percent of units of the formula

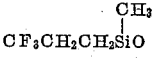
$$\underset{\underset{\text{CF}_3\text{CH}_2\text{CH}_2\text{SiO}}{|}}{\text{CH}_3}$$

4 mol percent of units of the structure

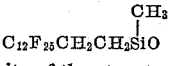
$$\underset{\underset{\text{C}_{12}\text{F}_{25}\text{CH}_2\text{CH}_2\text{SiO}}{|}}{\text{CH}_3}$$

0.7 mol percent of units of the structure

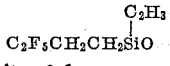
$$\underset{\underset{\text{C}_2\text{F}_5\text{CH}_2\text{CH}_2\text{SiO}}{|}}{\text{C}_2\text{H}_5}$$

0.2 mol percent of units of the structure

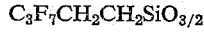
$$\text{C}_3\text{F}_7\text{CH}_2\text{CH}_2\text{SiO}_{3/2}$$

and 0.1 mol percent of $SiO_2$ units having a viscosity of 5,000 cs.

EXAMPLE 6

When any of the fillers listed below are substituted in the amounts shown for the silica in the grease of Example 2, good stable fluid resistant greases result.

(a) Six parts of a precipitated silica having a surface area of 65 square meters per gram.

(b) Four parts of a silica gel having on the surface thereof trimethylsiloxy groups, having a surface area of 900 square meters per gram.

(c) Eight parts of a silica aerogel having a surface area of 450 square meters per gram.

EXAMPLE 7

Equivalent results are obtained when the hydroxylated polysiloxane of Example 4 is replaced with the amounts of hydroxylated siloxanes listed below.

(a) Five parts of a hydroxylated polysiloxane of the unit formula $C_{14}F_{29}CH_2CH_2Si(C_2H_5)O$, having a hydroxyl content of 0.5 weight percent.

(b) One part of a hydroxylated polysiloxane of the unit formula $C_3F_7CH_2CH_2Si(CH_3)O$, the hydroxyl content of which is 2.8 weight percent.

(c) 1.3 parts of a hydroxylated polysiloxane containing 93 mol percent of units of the formula

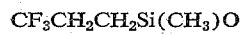
$$CF_3CH_2CH_2Si(CH_3)O$$

2 mol percent of units of the formula

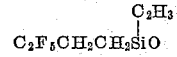
$$\underset{\underset{\text{C}_2\text{F}_5\text{CH}_2\text{CH}_2\text{SiO}}{|}}{\text{C}_2\text{H}_5}$$

and 5 mol percent of units of the formula

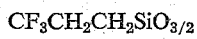
$$CF_3CH_2CH_2SiO_{3/2}$$

there being 5 percent by weight hydroxyl therein.

EXAMPLE 8

Equivalent results are obtained when either 0.1 part of boric acid, 0.5 part of pentaerythritol or both are added to the grease of Example 4.

EXAMPLE 9

Excellent stable greases are obtained when each of the following mixtures are prepared:

(a) One hundred parts of a siloxane copolymer containing 91 mol percent of

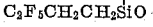
$$\underset{\underset{\text{C}_2\text{F}_5\text{CH}_2\text{CH}_2\text{SiO}}{|}}{\text{C}_2\text{H}_5}$$

units, and 9 mol percent of

$$\underset{\underset{\text{C}_2\text{H}_5\text{SiO}}{|}}{\text{CH}_3}$$

units, having a viscosity of 7,000 cs., 6 parts of a silica aerogel having a surface area of 150 square meters per gram, and 3 parts of a hydroxyl-endblocked 3,3,4,4,5,5,5-heptafluoropentylmethylpolysiloxane having a hydroxyl content of 1.9 weight percent.

(b) A phenyldimethylsilyl - endblocked polysiloxane containing 99.9 mol percent of units of the formula

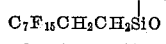
$$\underset{\underset{\text{C}_7\text{F}_{15}\text{CH}_2\text{CH}_2\text{SiO}}{|}}{\text{CH}_3}$$

and 0.1 mol percent of units of the formula

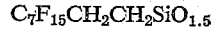
$$C_7F_{15}CH_2CH_2SiO_{1.5}$$

having a viscosity of 15,000 cs., 4.1 parts of a fume silica having a surface area of 325 square meters per gram, 1.3 parts of a hydroxyl-endblocked copolymer container 90 mol percent 3,3,3-trifluoropropylmethylsiloxane units, 8 mol percent of dimethylsiloxane units and 2 mol percent monomethylsiloxane units having a hydroxyl content of 4 percent by weight, and 0.2 part of red iron oxide powder.

That which is claimed is:

1. A grease comprising
   (1) 100 parts by weight of a polysiloxane fluid which has a viscosity of from 2,000 to 100,000 cs. at 25° C., in which essentially all the units have the formula

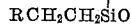
$$\underset{\underset{\text{RCH}_2\text{CH}_2\text{SiO}}{|}}{\text{R}'}$$

in which each R is a perfluoroalkyl radical and each R' is an aliphatic monovalent hydrocarbon radical of less than three carbon atoms,
   (2) from 4 to 8 parts inclusive by weight of a silica filler having a surface area of at least 50 square meters per gram, and
   (3) from 1 to 5 parts inclusive by weight of a hydroxylated polysiloxane fluid of from 0.5 to 5.0 weight percent hydroxyl content in which siloxane essentially all of the units are of the formula

$$\underset{\underset{\text{RCH}_2\text{CH}_2\text{SiO}}{|}}{\text{R}'}$$

wherein R and R' have the above defined meanings.

2. The composition according to claim 1 wherein R is trifluoromethyl and R' is methyl.

3. A grease comprising
   (1) 100 parts by weight of a polysiloxane fluid which has a viscosity of from 5,000 to 20,000 cs. at 25° C., in which essentially all the units have the formula $$\text{RCH}_2\text{CH}_2\overset{\overset{\text{R}'}{|}}{\text{Si}}\text{O}$$

in which each R is a perfluoroalkyl radical and each R' is an aliphatic monovalent hydrocarbon radical of less than three carbon atoms, (2) from 4 to 8 parts inclusive by weight of a silica filler having a surface area of at least 50 square meters per gram, and (3) from 1 to 5 parts inclusive by weight of a hydroxylated polysiloxane fluid of from 0.5 to 5.0 weight percent hydroxyl content in which siloxane essentially all of the units are of the formula $$\text{RCH}_2\text{CH}_2\overset{\overset{\text{R}'}{|}}{\text{Si}}\text{O}$$

wherein R and R' have the above defined meanings.

4. The composition according to claim 3 wherein R is trifluoromethyl and R' is methyl.

References Cited by the Examiner
UNITED STATES PATENTS 3,061,545  10/62  Badger ----------------- 252—28

FOREIGN PATENTS 899,659  6/62  Great Britain.

DANIEL E. WYMAN, *Primary Examiner*.

UNITED STATES PATENT OFFICE
CERTIFICATE OF CORRECTION

Patent No. 3,192,157                                      June 29, 1965

William G. Gowdy

It is hereby certified that error appears in the above numbered patent requiring correction and that the said Letters Patent should read as corrected below.

Column 4, line 47, for "3,142,251" read -- 3,146,251 --; column 6, line 48, after "0.32" insert -- part --.

Signed and sealed this 22nd day of February 1966.

(SEAL)
Attest:

ERNEST W. SWIDER                            EDWARD J. BRENNER
Attesting Officer                                 Commissioner of Patents